(No Model.)
F. McCABE.
FAUCET.
No. 299,564. Patented June 3, 1884.
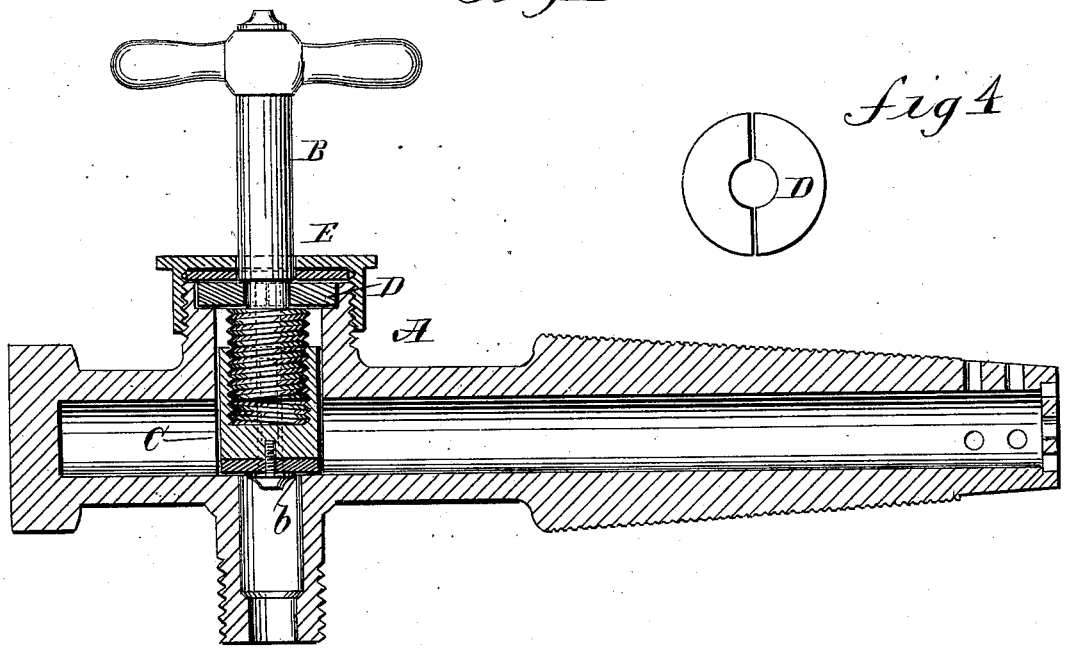
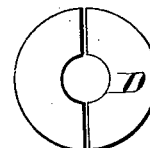
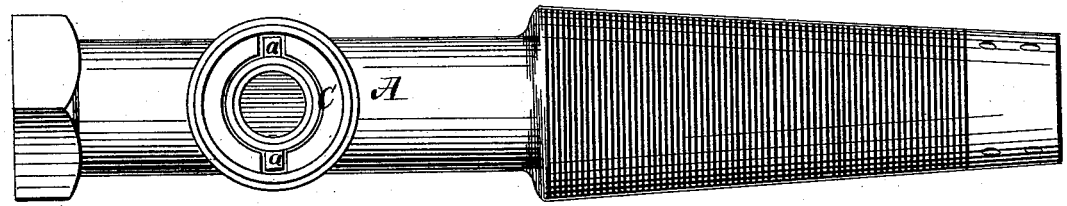
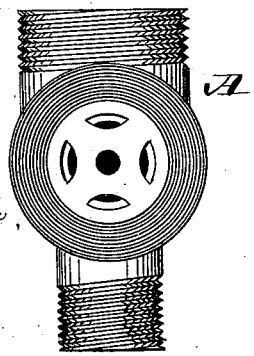
WITNESSES:
Francis McArdle
C. Sedgwick
INVENTOR:
F. McCabe
BY Munn & Co
ATTORNEYS.

UNITED STATES PATENT OFFICE.

FRANK McCABE, OF PROVIDENCE, RHODE ISLAND.

FAUCET.

SPECIFICATION forming part of Letters Patent No. 299,564, dated June 3, 1884.

Application filed May 16, 1883. (No model.)

*To all whom it may concern:*

Be it known that I, FRANK McCABE, of Providence, in the county of Providence and State of Rhode Island, have invented certain new and useful Improvements in Faucets, of which the following is a full, clear, and exact description.

The object of the invention is to swivel the screw-spindle which operates the valve to a ring or washer held between the screw-cap and a shoulder of the tube in which the spindle works, as hereinafter described.

Reference is to be had to the accompanying drawings, forming part of this specification, in which similar letters of reference indicate corresponding parts in all the figures.

Figure 1 is a longitudinal section of a faucet of my improved construction. Fig. 2 is a plan view with the cap and spindle removed. Fig. 3 is an end view of the faucet, and Fig. 4 shows the split washer which is employed.

A is the body of the faucet, of usual construction. B is the spindle, C the seating-piece, D the holding-washer, and E the screw-cap, of the faucet. The piece C is hollow or cup shape, and threaded internally to receive the threaded end of the spindle B, and the piece C is made with side lugs, $a$, entering grooves in the side of the bore. The spindle may be formed with a flange extending between cap E and the faucet-body, to prevent end movement of the spindle; or it may be made with a groove, as shown, to receive the split washer D for the same purpose. By this construction the seating-piece is made the spindle-turner, and rises and falls without turning, so that the packing $b$ is not rotated on the seat, thereby securing durability in the packing, and less wear than when the packing is attached to the rotating spindle.

Having thus described my invention, what I claim as new, and desire to secure by Letters Patent, is—

In a faucet, the combination of a split washer, D, a spindle, B, having an annular groove just above its thread to receive said washer, a valve-case rabbeted on the inside of its upper end to rigidly support the ring, and the screw-cap E, whereby the spindle is prevented from moving longitudinally as well as laterally, and thus all lost motion is avoided.

FRANK McCABE.

Witnesses:
OSCAR H. FREEMAN,
JOHN H. BROWN.